US008869002B2

(12) United States Patent
Kikuchi (10) Patent No.: US 8,869,002 B2
(45) Date of Patent: Oct. 21, 2014

(54) WIRELESS COMMUNICATION DEVICE AND DATA RECEPTION METHOD

(75) Inventor: Shingo Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 366 days.

(21) Appl. No.: 13/321,899

(22) PCT Filed: May 27, 2010

(86) PCT No.: PCT/JP2010/058987
§ 371 (c)(1),
(2), (4) Date: Nov. 22, 2011

(87) PCT Pub. No.: WO2010/137644
PCT Pub. Date: Dec. 2, 2010

(65) Prior Publication Data
US 2012/0063328 A1  Mar. 15, 2012

(30) Foreign Application Priority Data
May 27, 2009  (JP) .................................. 2009-128036

(51) Int. Cl.
*H03M 13/00*  (2006.01)
*G06F 11/00*  (2006.01)
*H04L 1/00*  (2006.01)
*H04L 29/08*  (2006.01)
*H04W 28/06*  (2009.01)
*H04L 25/03*  (2006.01)
*H04W 88/02*  (2009.01)
*H04W 80/02*  (2009.01)
*H04W 28/04*  (2009.01)

(52) U.S. Cl.
CPC ............ *H04L 1/0061* (2013.01); *H04L 1/0066* (2013.01); *H04W 28/06* (2013.01); *H04L 25/03159* (2013.01); *H04W 88/02* (2013.01); *H04L 69/324* (2013.01); *H04W 80/02* (2013.01); *H04W 28/04* (2013.01)
USPC ........................................... 714/758; 714/48

(58) Field of Classification Search
CPC ... H04L 1/0061; H04L 1/0057; H04L 1/0082; H04L 1/0066; H04L 69/324; H03M 13/15; H03M 13/09; G06F 11/08; G06F 11/1004; H04B 7/2637; H04W 28/04; H04W 80/02
USPC ....................................... 714/758, 799, 52, 48
See application file for complete search history.

(56) References Cited

U.S. PATENT DOCUMENTS 7,571,358 B2 *  8/2009  Yi et al. .......................... 714/48
7,730,380 B2 *  6/2010  Kim .............................. 714/758
(Continued)

FOREIGN PATENT DOCUMENTS

CN    1711713 A    12/2005
JP    2005318429 A    11/2005
(Continued)

OTHER PUBLICATIONS

International Search Report for PCT/JP2010/058987 mailed Aug. 31, 2010.
(Continued)

*Primary Examiner* — Phung M Chung
(74) *Attorney, Agent, or Firm* — Sughrue Mion, PLLC (57) ABSTRACT

The present disclosure eliminates the need for a buffer large enough to store a MAC PDU for the CRC check and eliminates processing delay involved in outputting data to, and inputting data from, the buffer. A wireless communication device analyzes and buffers an RLC data PDU, which is a data processing unit in the Radio Link Control layer (RLC layer), in the RLC layer without waiting for the completion of error detection processing, which is performed in the Medium Access Control layer (MAC layer), for a data processing unit (PDU) in the MAC layer. In the RLC layer, the wireless communication device references the result of the error detection processing for the MAC PDU performed in the MAC layer and creates an RLC Service Data Unit (RLC SDU) using an error-free RLC data PDU.

12 Claims, 5 Drawing Sheets

(56) References Cited

U.S. PATENT DOCUMENTS

| | | | |
|---|---|---|---|
| 8,331,386 B2 * | 12/2012 | Carmon et al. | 370/412 |
| 2002/0001296 A1 * | 1/2002 | Lee et al. | 370/338 |
| 2002/0021698 A1 * | 2/2002 | Lee et al. | 370/394 |
| 2008/0037588 A1 | 2/2008 | Yi | |
| 2008/0043651 A1 | 2/2008 | Okamoto et al. | |
| 2008/0137564 A1 | 6/2008 | Herrmann | |
| 2008/0240011 A1 * | 10/2008 | Kim et al. | 370/312 |
| 2010/0199139 A1 | 8/2010 | Shinohara et al. | |

FOREIGN PATENT DOCUMENTS

| | | |
|---|---|---|
| JP | 2006514817 A | 5/2006 |
| JP | 2006203265 A | 8/2006 |
| WO | 2009/044466 A1 | 4/2009 |

OTHER PUBLICATIONS

3GPP TS 36.322 118.5.0, Technical Specification Group Radio Access Network; Evolved Universal Terrestrial Radio Access (E-UTRA) Radio Link Control (RLC) protocol Specification (Release 8), Mar. 2009, pp. 21-31.

3GPP TS 36.321 V8.5.0, Technical Specification Group Radio Access Network; Evolved Universal Terrestrial Radio Access (E-UTRA) Radio Link Control (RLC) protocol Specification (Release 8), Mar. 2009, pp. 30-38.

Chinese Office Action with Search Report for CN Application No. 201080023075.1 issued on Nov. 25, 2013 with Partial English Translation.

* cited by examiner

WIRELESS COMMUNICATION DEVICE AND DATA RECEPTION METHOD

CROSS-REFERENCE TO RELATED APPLICATIONS

The present invention claims priority from Japanese Patent Application No. 2009-128036 (filed on May 27, 2009) the content of which is hereby incorporated in its entirety by reference into this specification.

TECHNICAL FIELD

The present invention relates to a wireless communication device and a data reception method, and more particularly to a wireless communication device and a data reception method that uses the MAC (Medium Access Control) protocol and the RLC (Radio Link Control) protocol defined by 3GPP (3rd Generation Partnership Project).

BACKGROUND

Non-Patent Document 1 and Non-Patent Document 2 define the specifications for the RLC protocol and the MAC protocol. According to those protocols, a data processing unit, called a PDU (Protocol Data Unit), is defined for each layer (see "6 Protocol data units, formats, and parameters" in Non-Patent Documents 1 and 2). A PDU used in the RLC layer is called an RLC PDU, and a PDU used in the MAC layer is called a MAC PDU. There are two types of RLC PDU: an RLC data PDU in which data is stored and an RLC control PDU that is used for control.

Patent Document 1 discloses a data processing method for use on a receiver's device in a wireless communication system. This data processing method, provided for use on an HSDPA (High Speed Downlink Packet Access) receiver's device whose MAC layer has the retransmission-function, comprises a step for transferring a data unit and the CRC (Cyclic Redundancy Code) check result, related to the data unit, from the MAC layer to the RLC layer; a step in the RLC layer for determining if the CRC check result, transferred from the MAC layer, indicates whether or not the data unit has an error; and a step for discarding the data unit if the data unit has an error and an error handling method is not provided.

PATENT DOCUMENT

[Patent Document 1] Japanese Patent Kohyo Publication No. JP2006-514817A

NON-PATENT DOCUMENTS

[Non-Patent Document 1] 3GPP TS 36.322 V8.5.0, March 2009, Radio Link Control (RLC) protocol Specification
[Non-Patent Document 2] 3GPP TS 36.321 V8.5.0, March 2009, Medium Access Control (MAC) protocol Specification

SUMMARY

The disclosures of Patent Document 1 and Non-Patent Documents 1 and 2 given above are hereby incorporated herein in their entirety by reference thereto. The following gives an analysis made by the present disclosure.

Figure 3:
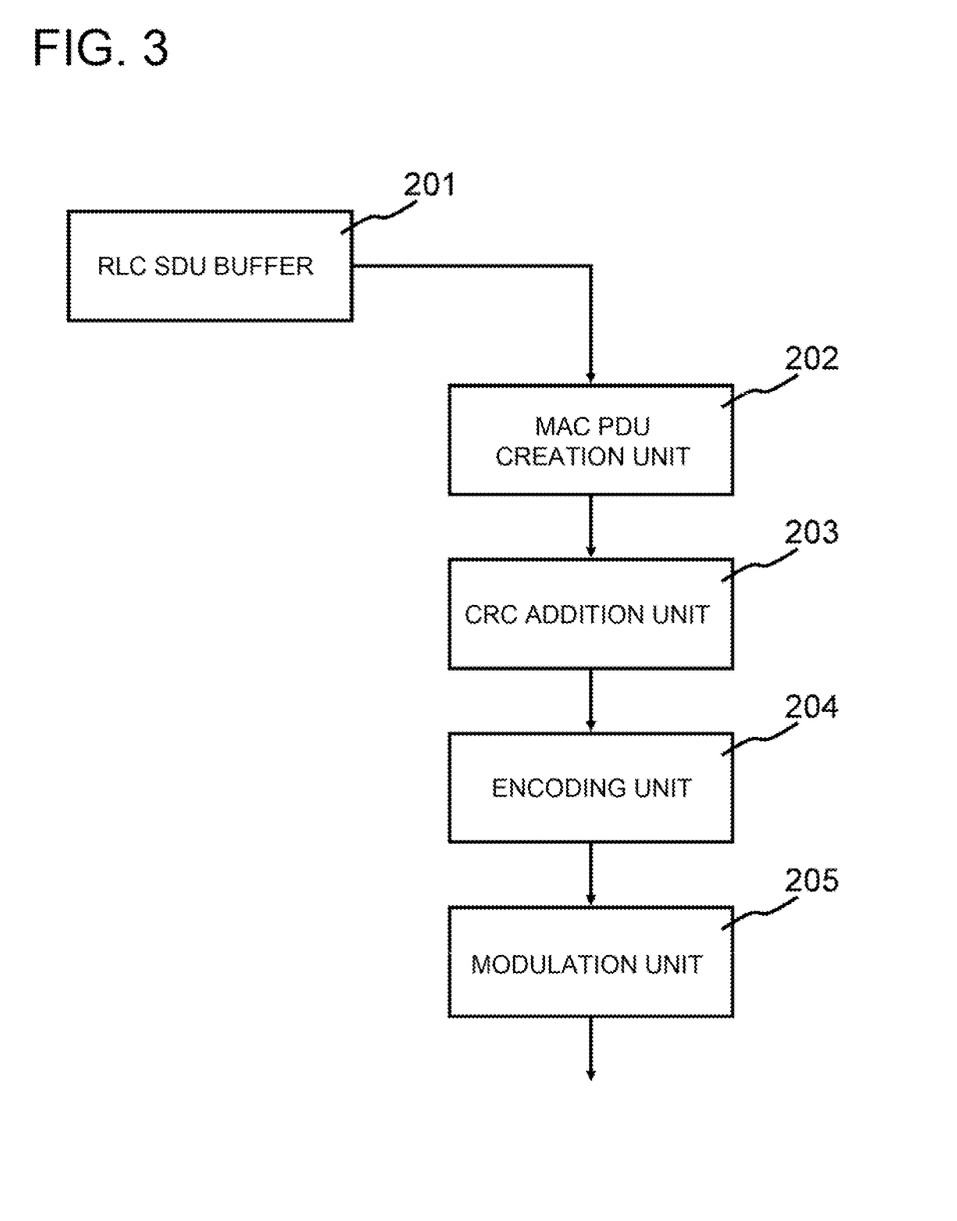
FIG. 3 is a diagram showing an example of the configuration of an RLC and MAC transmission processing unit of a wireless communication device (mobile station).
Figure 4:
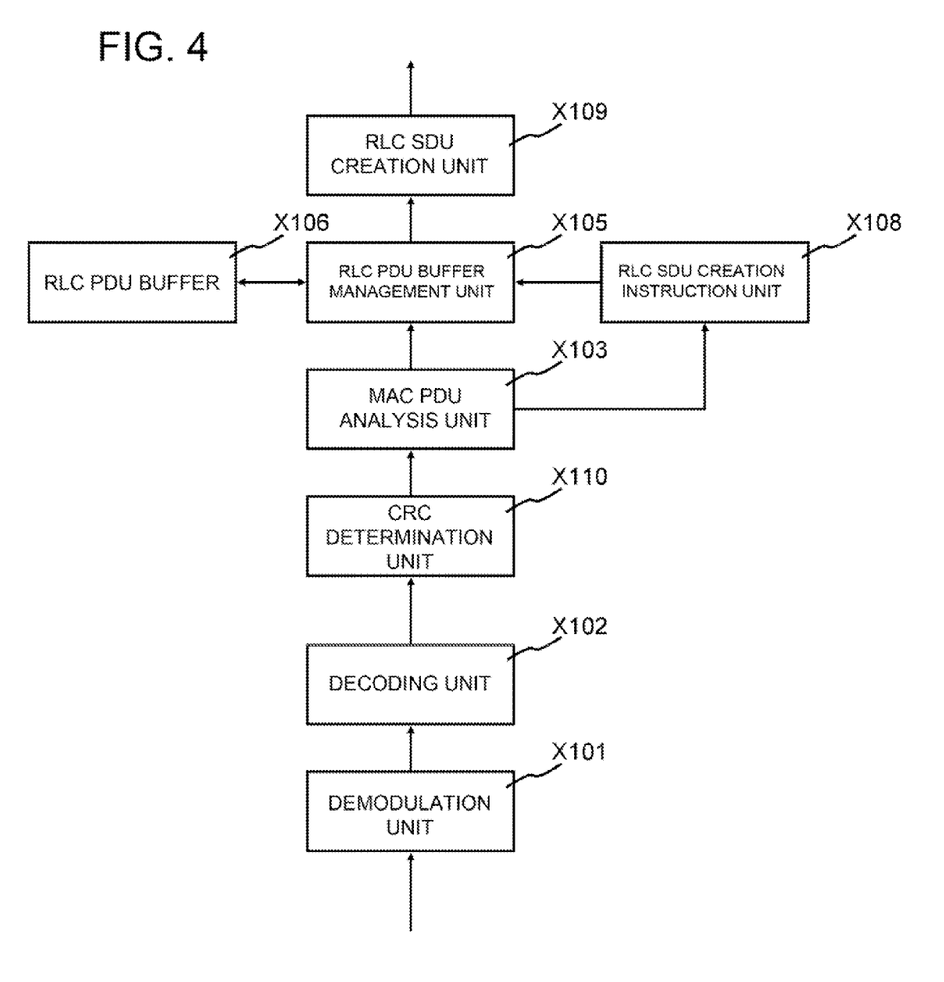
FIG. 4 is a diagram showing an example of the configuration of an RLC and MAC reception processing unit of a base station.

The following describes the operation of a wireless communication device (mobile station) and a base station that use the RLC and MAC protocols described above. FIG. 3 is a diagram showing an example of the configuration of the RLC and MAC transmission processing unit of a transmitting device. FIG. 4 is a diagram showing an example of the configuration of the RLC and MAC reception processing unit of a receiving device.

A MAC PDU creation unit 202 in FIG. 3 retrieves RLC SDUs (Service Data Units) from an RLC SDU buffer 201 and adds the RLC header to the retrieved RLC SDUs to create an RLC data PDU. The MAC PDU creation unit 202 adds the corresponding MAC sub-header to the RLC data PDU and, in addition, adjusts the length with padding to create a MAC PDU.

Figure 5:
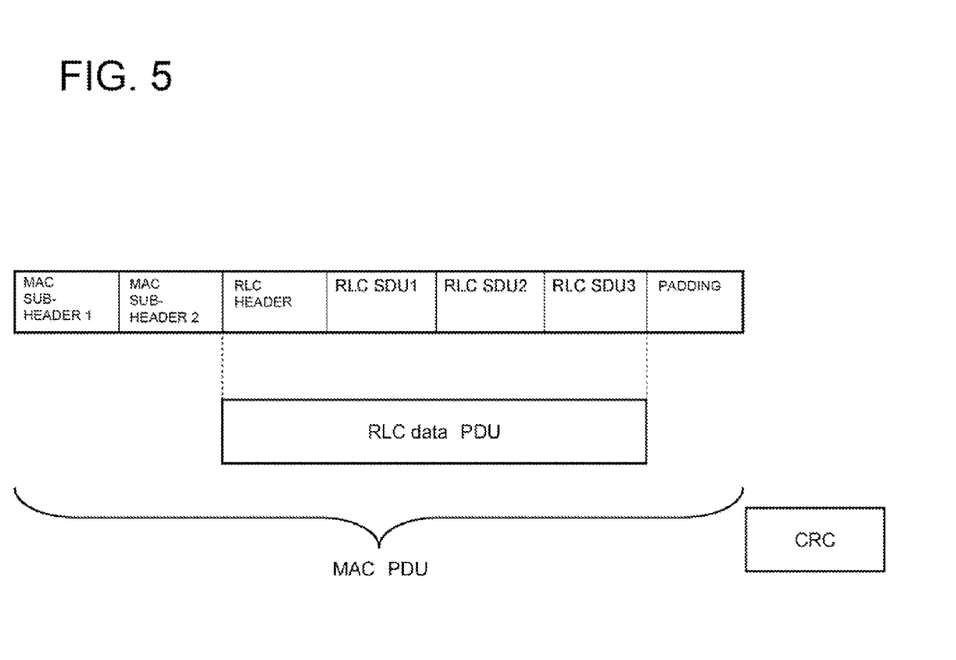
FIG. 5 is a diagram showing the configuration of a MAC PDU.

FIG. 5 is a diagram showing an example of a MAC PDU created by the MAC PDU creation unit 202. In the example in FIG. 5, three RLC SDUs 1-3 are combined and the RLC header is added to the combined RLC SDUs to create an RLC data PDU, with the padding added after the RLC data PDU. MAC sub-header 1 corresponding to the RLC data PDU (MAC SDU) and MAC sub-header 2 corresponding to the padding are added to create a MAC PDU.

After that, a CRC addition unit 203 shown in FIG. 3 adds a CRC to the MAC PDU as the error detection code, an encoding unit 204 performs encoding using the turbo codes, and a modulation unit 205 modulates the encoded data for generating the transmission signal.

When the signal generated in this way is received by the receiving device shown in FIG. 4, a demodulation unit X101 first demodulates the signal, a decoding unit X102 decodes the demodulated signal, and then a CRC determination unit X110 checks the CRC of the MAC PDU. If the CRC check result indicates that no error is detected, the decoded MAC PDU is input to a MAC PDU analysis unit X103.

The MAC PDU analysis unit X103 de-multiplexes the signal and passes the RLC data PDU to an RLC PDU buffer management unit X105. The RLC PDU buffer management unit X105 stores the RLC data PDU in the free area of an RLC PDU buffer X106. In addition, the MAC PDU analysis unit X103 notifies the RLC header of the RLC data PDU to an RLC SDU creation instruction unit X108. The RLC SDU creation instruction unit X108 analyzes the RLC header and supplies the information, required to create RLC SDUs from the RLC PDU, to the RLC SDU buffer management unit X105. Based on this information, the RLC PDU buffer management unit X105 passes the RLC data PDU, required to build the RLC SDUs, to an RLC SDU creation unit X109. The RLC SDU creation unit X109 combines the RLC data PDUs and rebuilds the RLC SDU.

As described above, the MAC PDU receiving device is configured to check the CRC of the MAC PDU to confirm that the checking result indicates that there is no error and, after that, enter the MAC PDU to the MAC PDU analysis unit X103 to create RLC SDUs.

However, the receiving device can start the CRC check and complete its calculation only after the whole MAC PDU is decoded. For this reason, until the CRC check result is calculated, a buffer for storing the decoded MAC PDU is required. Therefore, the problem is that the CRC determination unit X110 requires a buffer memory large enough to store the MAC PDU.

In addition, after data is stored in the buffer and it is determined that, as a result of the CRC check, no error is detected, the data must be retrieved again from the buffer for transmission to the MAC PDU analysis unit X103. For this reason, the operation is required to store data in the buffer, to wait for the result of the CRC check, and to retrieve the data from the buffer. Therefore, the problem is that processing delay is generated from the time the data is stored in the buffer to the time the data is retrieved from the buffer.

In view of the foregoing, it is an object of the present disclosure to provide a configuration and a method for eliminating the need for a buffer large enough to store a MAC PDU for the error detection processing such as CRC and for eliminating processing delay involved in outputting data from, or inputting data into, the buffer.

According to a first aspect of the present disclosure, there is provided a wireless communication device that, in a Radio Link Control layer (RLC layer), analyzes and buffers an RLC data PDU without waiting for completion of error detection processing in which an error detection code is used, the RLC data PDU being a data processing unit in the RLC layer, the error detection processing performed in a Medium Access Control layer (MAC layer), the error detection code attached to a data processing unit (PDU) in the MAC layer and, in the RLC layer, references a result of the error detection processing of the MAC PDU performed in the MAC layer and creates an RLC Service Data Unit (RLC SDU) using an error-free RLC data PDU.

According to a second aspect of the present disclosure, there is provided a data reception method comprising in a Radio Link Control layer (RLC layer), analyzing and buffering an RLC data PDU without waiting for completion of error detection processing in which an error detection code is used, the RLC data PDU being a data processing unit in the RLC layer, the error detection processing performed in a Medium Access Control layer (MAC layer), the error detection code attached to a data processing unit (PDU) in the MAC layer, and in the RLC layer, referencing a result of the error detection processing of the MAC PDU performed in the MAC layer and creates an RLC Service Data Unit (RLC SDU) using an error-free RLC data PDU.

The meritorious effects of the present disclosure are summarized as follows.

The present disclosure eliminates the need not only for a buffer large enough to store a MAC PDU for the error detection processing but also for the data input/output operation for the buffer. The reason is that a configuration is used in which RLC data PDUs included in a MAC PDU are analyzed and buffered without waiting for the completion of the CRC check and RLC SDUs are created using the buffered RLC data PDUs.

PREFERRED MODES

Figure 1:
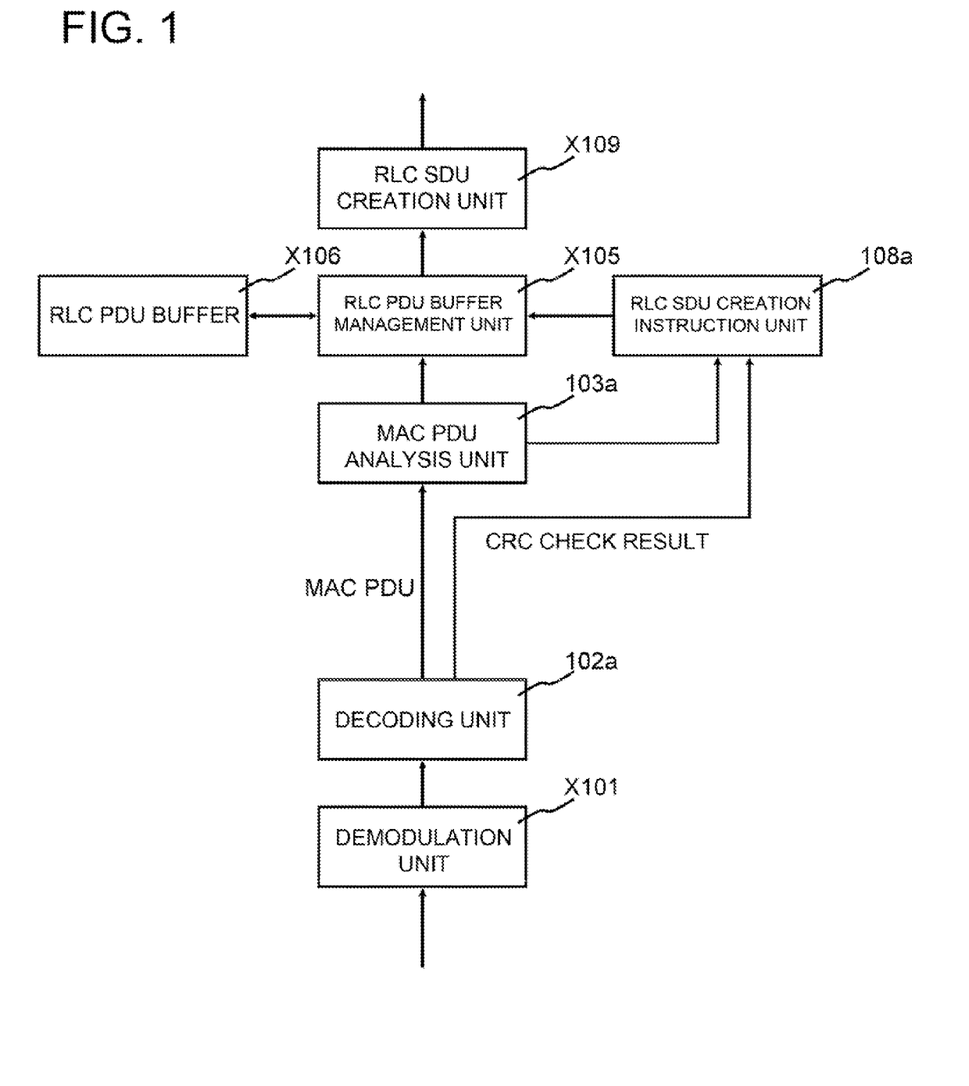
FIG. 1 is a block diagram showing the outline of the present disclosure.

First, the following describes the outline of an exemplary embodiment of the present disclosure. As shown in FIG. 1, a wireless communication device of the present exemplary embodiment has a circuit configuration in which a MAC PDU is output to a MAC PDU analysis unit 103a in the RLC layer after a received signal is demodulated and decoded. The MAC PDU analysis unit 103a extracts RLC data PDUs from the MAC PDU and, via an RLC PDU buffer management unit X105, stores the extracted RLC data PHUs in an RLC PDU buffer X106. After that, an RLC SDU creation instruction unit 108a, also provided in the RLC layer, issues an instruction to create RLC SDUs using the stored RLC data PDUs or to delete RLC data PDUs according to the CRC check result.

As shown in FIG. 1, a decoding unit 102a may perform the CRC check or another configuration is also possible in which processing means for performing the CRC check is provided separately.

The above configuration eliminates the need for a buffer in which a MAC PDU is held until the CRC check result is obtained and the need for outputting data to, and inputting data from, the buffer.

First Exemplary Embodiment

Figure 2:
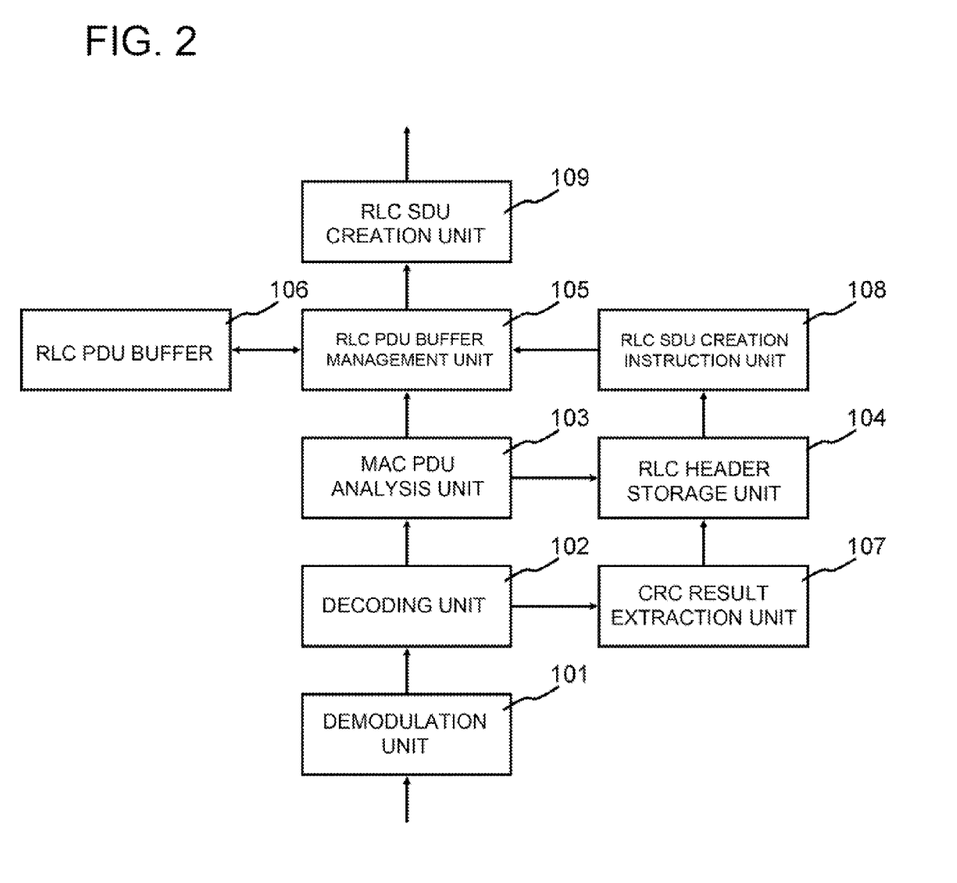
FIG. 2 is a block diagram showing the configuration of a first exemplary embodiment of the present disclosure.

Next, a first exemplary embodiment of the present disclosure will be described more in detail below with reference to the drawings. FIG. 2 is a block diagram showing the configuration of the data receiving part of a wireless communication device in the first exemplary embodiment of the present disclosure.

Referring to FIG. 2, the data receiving part of the wireless communication device comprises a demodulation unit 101, a decoding unit 102, a MAC PDU analysis unit 103, an RLC header storage unit 104, an RLC PDU buffer management unit 105, an RLC PDU buffer 106, a CRC result extraction unit 107, an RLC SDU creation instruction unit 108, and an RLC SDU creation unit 109. These components operate as follows.

The demodulation unit 101 is a circuit that performs channel estimation and, using the channel estimation result, demodulates the received signal.

The decoding unit 102 is a circuit that performs error correction using the demodulation result and, after outputting a MAC PDU, calculates the CRC check result of the MAC PDU.

The MAC PDU analysis unit 103 is a circuit that analyzes the MAC sub-header included in the MAC PDU and de-multiplexes the MAC PDU into the MAC control element, RLC data PDU, or RLC control PDU. In addition, the MAC PDU analysis unit 103 extracts the RLC header from the RLC data PDU and outputs the extracted RLC header to the RLC header storage unit 104.

The RLC header storage unit 104 is a buffer in which the RLC header of the RLC data PDU is stored.

The RLC PDU buffer management unit 105 is a circuit that manages the RLC PDU buffer 106. The RLC PDU buffer management unit 105 stores the location in the RLC PDU buffer 106 where each RLC data PDU is stored.

The RLC PDU buffer 106 is a buffer in which RLC data PDUs are stored.

The CRC result extraction unit 107 is a circuit that detects the CRC check result of the MAC PDU, calculated by the decoding unit 102, and embeds the detected CRC check result in the RLC header stored in the RLC header storage unit 104.

The RLC SDU creation instruction unit 108 is a circuit that creates information on an RLC data PDU required for creating RLC SDUs and information on an RLC data PDU to be discarded and notifies the created information to the RLC PDU buffer management unit 105.

The RLC SDU creation unit 109 is a circuit that combines RLC data PDUs received from the RLC PDU buffer management unit 105 and builds (creating) RLC SDUs.

Next, the following describes the step-by-step operation of this exemplary embodiment that is performed when the transmission signal is received. It is assumed in the description below that a wireless communication device (base station) has received the transmission signal from a mobile terminal (mobile station).

The transmission signal transmitted from the mobile terminal (mobile station) is input to the demodulation unit 101. The demodulation unit 101 performs channel estimation using the reference signal of the reception signal, obtains the channel estimation result on the frequency axis and, based on this result, calculates the weight of the frequency equalizer. Frequency equalization is performed by multiplying the reception signal by this weight. In addition, the demodulation unit 101 calculates the LLR (Log Likelihood Ratio) from the signal in the frequency direction and transmits the calculation result to the decoding unit 102.

The decoding unit 102 performs turbo decoding based on the LLR to decode the MAC PDU and outputs the decoded MAC PDU to the MAC PDU analysis unit 103. The decoding unit 102 calculates the CRC check result of the MAC PDU. The CRC check result is held so that it can be referenced from the CRC result extraction unit 107.

The MAC PDU analysis unit 103 starts the analysis of the MAC sub-headers immediately after the MAC PDU is received, that is, before the CRC check result of the MAC PDU is calculated.

By setting, in advance, the number of MAC sub-headers (number of MAC SDUs) in the MAC PDU or the upper limit value of the MAC PDU length, it is possible to instruct the MAC PDU analysis unit 103 to discard the MAC PDU and stop the subsequent processing if the number of received MAC sub-headers exceeds the upper limit value of MAC sub-headers or if the MAC PDU length (size) exceeds the upper limit value. The MAC PDU length may also be obtained by the sum of the values of the L fields (see Non-Patent Document 2; this field indicates the length of the corresponding MAC SDU) in the MAC sub-headers.

If the number of MAC sub-headers (number of MAC SDUs) in the MAC PDU or the MAC PDU length is equal to or smaller than the upper limit value, the MAC PDU analysis unit 103 extracts the RLC data PDUs from the received MAC PDU and transmits them to the RLC PDU buffer management unit 105. In addition, the MAC PDU analysis unit 103 extracts the RLC header from the RLC data PDU, transmits it to the RLC header storage unit 104, and holds it until the CRC check result of the MAC PDU is calculated.

The RLC PDU buffer management unit 105 stores the RLC data PDUs, received from the MAC PDU analysis unit 103, in the free area in the RLC PDU buffer 106. For all RLC data PDUs included in one MAC PDU, the MAC PDU analysis unit 103 and the RLC PDU buffer management unit 105 repeat the processing described above.

On the other hand, the CRC result extraction unit 107 references the CRC check result of the MAC PDU calculated by the decoding unit 102 and notifies the information on the storage position and the length of the RLC header and the RLC data PDUs to the RLC SDU creation instruction unit 108.

The notification is created by embedding (writing) one-bit information, which indicates whether an error is detected in the CRC check result, in the PLC header. In this exemplary embodiment, if an error is detected, "1" is embedded; if an error is not detected, "0" is embedded.

If the CRC check result is 0, the RLC SDU creation instruction unit 108 creates the information for building RLC SDUs from the RLC data PDU using the RLC header stored in the RLC header storage unit 104 and then notifies the created information to the RLC PDU buffer management unit 105. This notification includes the following information for building RLC SDUs: information on the storage position of an RLC PDU, which will be used, within the RLC PDU buffer 106 and information on the byte position in the RLC PDU at which an RLC SDU starts and the number of bytes of the RLC SDU (offset within the RLC PDU, number of bytes in the RLC PDU).

The RLC PDU buffer management unit 105 retrieves the RLC SDUs from the RLC PDU buffer 106 based on the information described above, and transmits the retrieved RLC SDUs to the RLC SDU creation unit 109.

The RLC SDU creation unit 109 combines the retrieved RLC SDUs and builds the RLC SDUs. In addition, when an RLC PDU is used for building RLC SDUs and therefore there is no need for the RLC PDU to be stored in the RLC PDU buffer 106 anymore, the RLC SDU creation instruction unit 108 outputs an instruction to the RLC PDU buffer management unit 105 to delete the RLC PDU from this RLC PDU buffer 106. This instruction includes the information on the storage position within the buffer at which the RLC PDU to be deleted is stored.

On the other hand, if the CRC check result is 1, the RLC SDU creation instruction unit 108 outputs an instruction to the RLC PDU buffer management unit 105 to delete the RLC data PDU, which includes the RLC header in which the bit value of 1 is embedded, from the RLC PDU buffer 106. This instruction includes information on the storage position within the buffer at which the RLC PDU to be deleted is stored.

Until it is determined that no error is detected in the CRC check result of a MAC PDU, the analysis processing of the MAC PDU must be held in the configuration shown in FIG. 3 and FIG. 4 as described above. In contrast, the analysis of a MAC PDU is completed in this exemplary embodiment before the CRC check result of the MAC PDU is known. Therefore, the configuration of this exemplary embodiment reduces the time required for the processing in the RLC layer.

Until the CRC check result is known, a MAC PDU must be stored in the temporary buffer in the configuration shown in FIG. 3 and FIG. 4. In contrast, a MAC PDU is de-multiplexed in this exemplary embodiment before the CRC check result of the MAC PDU is known and the RLC data PDUs, generated as the result of de-multiplexing, are stored in the RLC PDU buffer 106. Therefore, this configuration eliminates the need for the temporary buffer and saves memory.

In this exemplary embodiment, the CRC check result of a MAC PDU is embedded in the RLC header, the CRC result extraction unit 107 in the RLC layer references the embedded result, and the RLC SDU creation instruction unit 108 in the RLC layer deletes the RLC data PDU, corresponding to a MAC PDU in which a CRC error is detected, from the RLC PDU buffer 106. Therefore, combined with the deletion of an RLC data PDU, which becomes unnecessary in the RLC PDU buffer 106, after building the RLC SDUs, the deletion from the RLC PDU buffer 106 can be integrally managed only in the RLC layer.

In addition, if the number of sub-headers of a received MAC PDU exceeds a predetermined upper limit value or if the size of a received MAC PDU or the sum of the values in the L fields in the MAC PDU sub-headers exceeds a predetermined upper limit value, the MAC PDU is discarded in this exemplary embodiment. This avoids the condition in which the RLC PDU buffer 106 overflows.

While the exemplary embodiment of the present disclosure has been described, it is to be understood that the present disclosure is not limited to the exemplary embodiment above and that further modifications, replacements, and adjustments may be added without departing from the scope of the basic technical concept of the present disclosure. For example, though the CRC check result is embedded in the RLC header in the description above, the CRC check result may be embedded also in the header that is provided after the RLC header.

For example, the error detection processing using CRC is used in the exemplary embodiment described above, the present disclosure is applicable also to a configuration in which error detection processing using another error detection code is used.

In the following, preferred modes are summarized.

Mode 1

A wireless communication device that
in a Radio Link Control layer (RLC layer), analyzes and buffers an RLC data PDU without waiting for completion of error detection processing in which an error detection code is used, the RLC data PDU being a data processing unit in the RLC layer, the error detection processing performed in a Medium Access Control layer (MAC layer), the error detection code attached to a data processing unit (PDU) in the MAC layer, and
in the RLC layer, references a result of the error detection processing of the MAC PDU performed in the MAC layer and creates an RLC Service Data Unit (RLC SDU) using an error-free RLC data PDU.

Mode 2

The wireless communication device as defined by mode 1, comprising: a decoding unit that outputs the MAC PDU, obtained by decoding a modulated received signal, to a MAC PDU analysis unit and, after that, calculates a Cyclic Redundancy Check checking result (CRC check result);
the MAC PDU analysis unit that extracts an RLC data PDU from the received MAC PDU and analyzes the extracted RLC data PDU; and
an RLC SDU creation instruction unit that creates an RLC SDU from the RLC data PDU or discards the RLC data PDU based on the CRC check result calculated by the decoding unit.

Mode 3

The wireless communication device as defined by mode 2, further comprising:
an RLC header storage unit that stores an RLC header extracted from the RLC data PDU by the MAC PDU analysis unit; and
a CRC result extraction unit that references the CRC check result calculated by the decoding unit and writes the CRC check result in the RLC header stored in the RLC header storage unit wherein
the RLC SDU creation instruction unit references the RLC header to determine if the CRC check result is correct.

Mode 4

The wireless communication device as defined by mode 2 or 3 wherein if a number of sub-headers of the received MAC PDU exceeds a predetermined upper limit value, the MAC PDU analysis unit discards the MAC PDU.

Mode 5

The wireless communication device as defined by one of modes 2-4 wherein
if a size of the received MAC PDU or a sum of values in L fields in the MAC PDU sub-headers exceeds a predetermined upper limit value, the MAC PDU analysis unit discards the MAC PDU.

Mode 6

A data reception method comprising:
in a Radio Link Control layer (RLC layer), analyzing and buffering an RLC data PDU without waiting for completion of error detection processing in which an error detection code is used, the RLC data PDU being a data processing unit in the RLC layer, the error detection processing performed in a Medium Access Control layer (MAC layer), the error detection code attached to a data processing unit (PDU) in the MAC layer; and
in the RLC layer, referencing a result of the error detection processing of the MAC PDU performed in the MAC layer and creating an, RLC Service Data Unit (RLC SDU) using an error-free RLC data PDU.

Mode 7

The data reception method as defined by mode 6, further comprising:
if a number of sub-headers of the received MAC PDU exceeds a predetermined upper limit value, discarding the MAC PDU.

Mode 8

The data reception method as defined by mode 6, further comprising:
if a size of the received MAC PDU or a sum of values in L fields in the MAC PDU sub-headers exceeds a predetermined upper limit value, discarding the MAC PDU.

The exemplary embodiment and the examples may be changed and adjusted in the scope of the entire disclosure (including claims) of the present disclosure and based on the basic technological concept. In the scope of the claims of the present disclosure, various disclosed elements may be combined and selected in a variety of ways. That is, it is to be understood that the present disclosure includes modifications and changes that may be made by those skilled in the art according to the entire disclosure, including the claims, and the technological concept.

EXPLANATIONS OF SYMBOLS

101 Demodulation unit
102,102a Decoding unit
103,103a MAC PDU analysis unit
104 RLC header storage unit
105 RLC PDU buffer management unit
106 RLC PDU buffer
107 CRC result extraction unit
108,108a RLC SDU creation instruction unit
109 RLC SDU creation unit
201 RLC SDU buffer
202 MAC PDU creation unit
203 CRC addition unit
204 Encoding unit
205 Modulation unit

What is claimed is:

1. A wireless communication device comprising:
   a unit analysis and buffering unit that, in a Radio Link Control (RLC) layer (layer), analyzes and buffers an RLC data protocol data unit (PDU) without waiting for completion of error detection processing that has previously been started by error detection code in a Medium Access Control (MAC) layer and in which an error detection code is used, where the RLC data PDU is a data processing unit in the RLC layer, and the error detection code is attached to a PDU in the MAC layer; and
   a referencing unit that, in the RLC layer, responsive to and after the error detection processing has been performed, references a result of the error detection processing of a MAC PDU performed in the MAC layer and creates an RLC Service Data Unit (SDU) using an error-free RLC data PDU.

2. The wireless communication device as defined by claim 1, comprising:
- a decoding unit that outputs the MAC PDU, obtained by decoding a modulated received signal, to a MAC PDU analysis unit and calculates a Cyclic Redundancy Check checking result (CRC check result) from the MAC PDU;
- the MAC PDU analysis unit that extracts an RLC data PDU from the received MAC PDU and analyzes the extracted RLC data PDU; and
- an RLC SDU creation instruction unit that creates an RLC SDU from the RLC data PDU or discards the RLC data PDU based on the CRC check result calculated by said decoding unit.

3. The wireless communication device as defined by claim 2, further comprising:
- an RLC header storage unit that stores an RLC header extracted from the RLC data PDU by said MAC PDU analysis unit; and
- a CRC result extraction unit that references the CRC check result calculated by said decoding unit and writes the CRC check result in the RLC header stored in said RLC header storage unit; wherein
- said RLC SDU creation instruction unit references the RLC header to determine if the CRC check result is correct.

4. The wireless communication device as defined by claim 3, wherein the received MAC PDU comprises one or more sub-headers, and
- wherein said MAC PDU analysis unit discards the MAC PDU if a number of the sub-headers of the received MAC PDU exceeds a predetermined upper limit value.

5. The wireless communication device as defined by claim 3, wherein the received MAC PDU comprises one or more sub-headers and each sub-header of the received MAC PDU comprises an L field, and
- wherein said MAC PDU analysis unit discards the MAC PDU if a size of the received MAC PDU or a sum of values in the L fields of the MAC PDU sub-headers exceeds a predetermined upper limit value.

6. The wireless communication device as defined by claim 2, wherein the received MAC PDU comprises one or more sub-headers, and
- wherein said MAC PDU analysis unit discards the MAC PDU if a number of the sub-headers of the received MAC PDU exceeds a predetermined upper limit value.

7. The wireless communication device as defined by claim 6, wherein each sub-header of the received MAC PDU comprises an L field, and
- wherein said MAC PDU analysis unit discards the MAC PDU if a size of the received MAC PDU or a sum of values in the L fields of the MAC PDU sub-headers exceeds a predetermined upper limit value.

8. The wireless communication device as defined by claim 2, wherein the received MAC PDU comprises one or more sub-headers and each sub-header of the received MAC PDU comprises an L field, and
- wherein said MAC PDU analysis unit discards the MAC PDU if a size of the received MAC PDU or a sum of values in the L fields of the MAC PDU sub-headers exceeds a predetermined upper limit value.

9. A data reception method comprising:
- starting error detection processing by error detection code in a Medium Access Control (MAC) layer, the error detection code attached to a protocol data unit (PDU) in the MAC layer;
- in a Radio Link Control (RLC) layer, analyzing and buffering an RLC data PDU without waiting for completion of error detection processing; and
- in the RLC layer, responsive to and after the error detection processing has been performed, referencing a result of the error detection processing of a MAC PDU performed in the MAC layer and creating an RLC Service Data Unit (RLC SDU) using an error-free RLC data PDU.

10. The data reception method as defined by claim 9, wherein the received MAC PDU comprises one or more sub-headers, and the method further comprises:
- discarding the MAC PDU if a number of sub-headers of the received MAC PDU exceeds a predetermined upper limit value.

11. The data reception method as defined by claim 10, wherein each sub-header of the received MAC PDU comprises an L field, and the method further comprises:
- discarding the MAC PDU if a size of the received MAC PDU or a sum of values in the L fields in the MAC PDU sub-headers exceeds a predetermined upper limit value.

12. The data reception method as defined by claim 9, wherein the received MAC PDU comprises one or more sub-headers and each sub-header of the received MAC PDU comprises an L field, and the method further comprises:
- discarding the MAC PDU if a size of the received MAC PDU or a sum of values in L fields in the MAC PDU sub-headers exceeds a predetermined upper limit value.

* * * * *